Patented Feb. 9, 1932

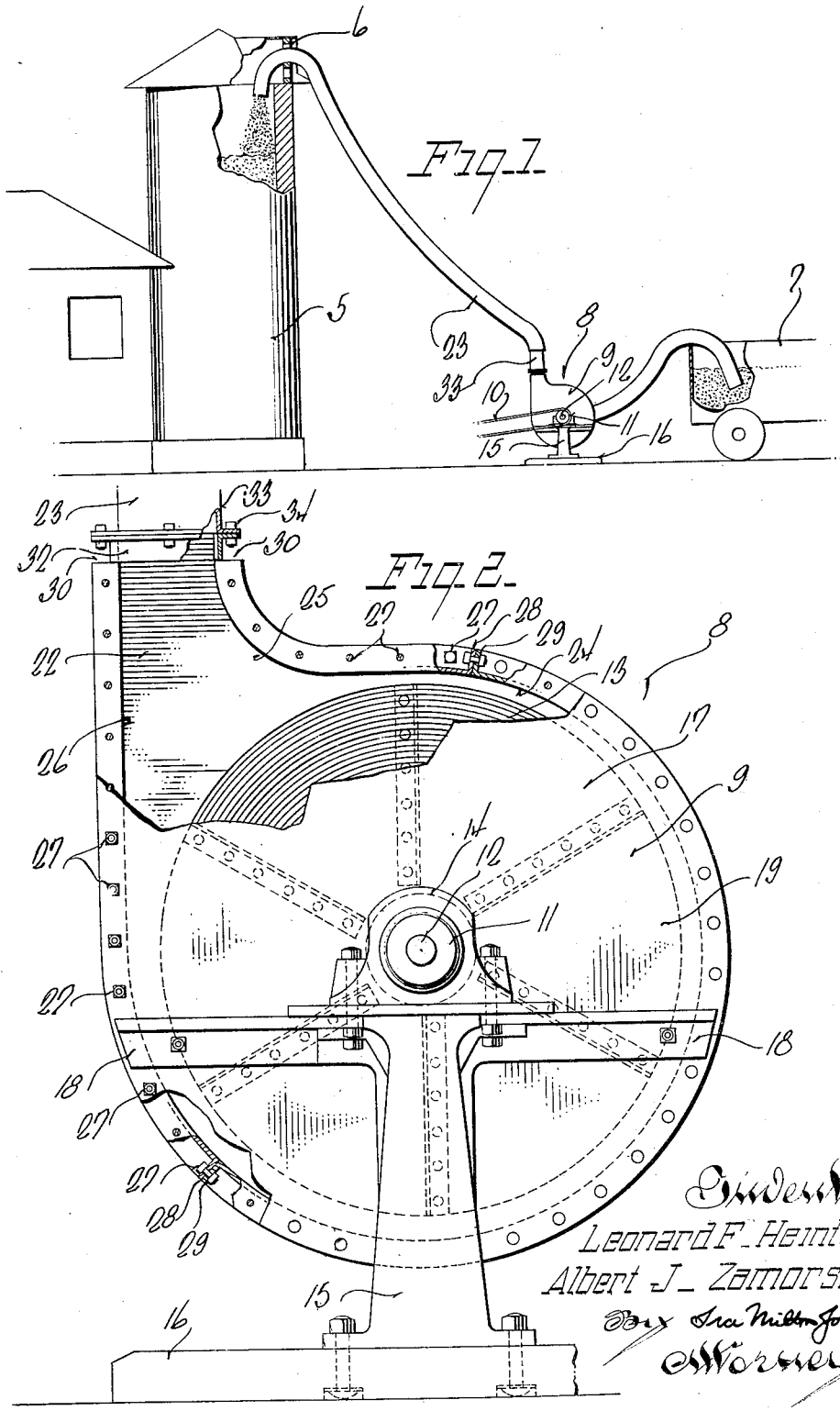

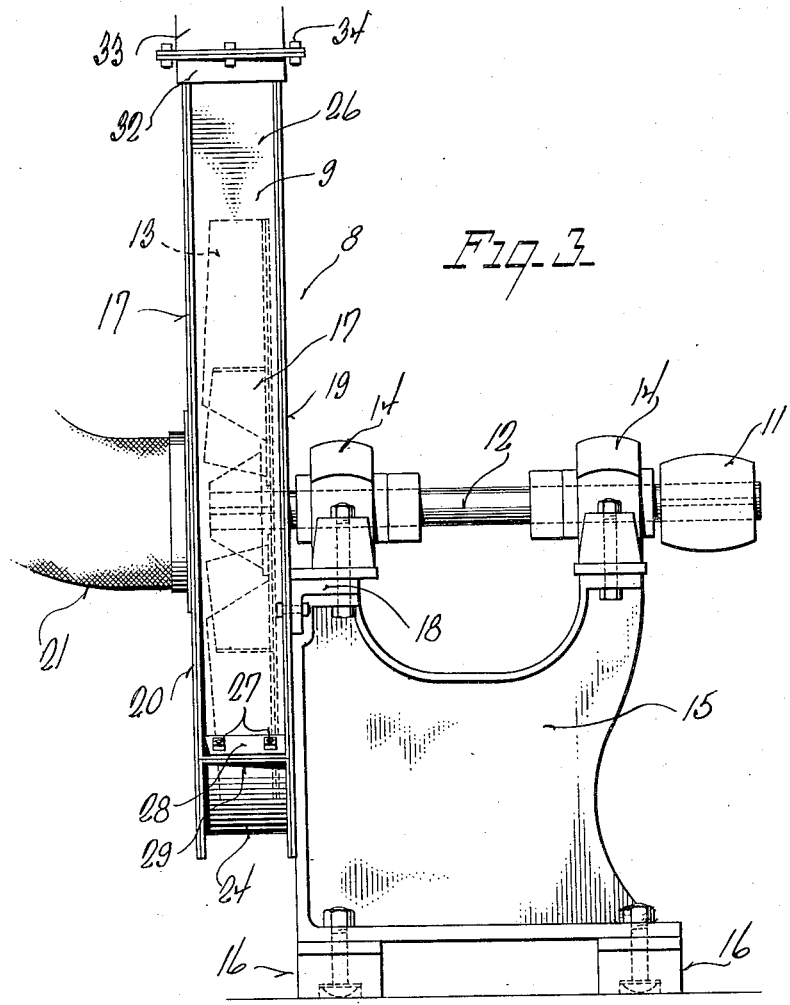
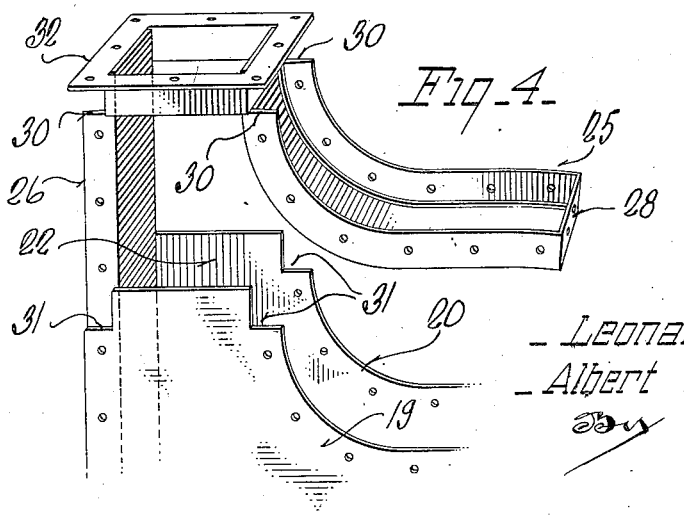

1,844,065

UNITED STATES PATENT OFFICE

LEONARD F. HEINTZ AND ALBERT J. ZAMORSKI, OF NORTH PRAIRIE, WISCONSIN

SILO FILLING DEVICE

Application filed January 17, 1930. Serial No. 421,439.

This invention relates to certain new and useful improvements in silo filling devices.

Heretofore, it has been customary to manually or otherwise feed the silage into the mouth of a conveyor which either mechanically or pneumatically carried the silage up and into the silo. This method entailed considerable manual labor in that it required the filling of the wagons or other means of conveyance and their unloading and the constant feeding of the material to the conveying means.

It is, therefore, one of the objects of this invention to simplify the filling of the silos and to reduce the manual labor in connection therewith. This object is obtained by providing a pneumatic conveyor having means for drawing the silage from the conveying vehicles.

Another object of this invention resides in the novel construction of the blowers of pneumatic silo filling devices whereby those portions receiving greatest wear are readily removable to permit their replacement.

With the above and other objects in view which will appear as the description proceeds, our invention resides in the novel construction, combination and arrangement of parts substantially as hereinafter described and more particularly defined by the appended claim, it being understood that such changes in the precise embodiment of the hereindisclosed invention may be made as come within the scope of the claim.

In the accompanying drawings, we have illustrated one complete example of the physical embodiment of our invention constructed according to the best mode we have so far devised for the practical application of the principles thereof, and in which:

Figure 1 is a diagrammatic view illustrating the manner of filling a silo with our improved conveying mechanism;

Figure 2 is a side elevational view with parts broken away of the blower per se;

Figure 3 is a front view thereof; and

Figure 4 is a fragmentary, perspective view illustrating in detail the construction of a portion of the blower.

Referring now more particularly to the accompanying drawings, in which like numerals designate like parts throughout the several views, the numeral 5 represents a conventional silo having an inlet opening 6 at its upper end. The silage or other material to be stored in the silo is conveyed from the fields in wagons or other suitable conveying vehicles 7 and is conveyed from the vehicles directly into the silo by my improved pneumatic conveying mechanism indicated generally as at 8.

The conveying mechanism 8 comprises a blower 9 driven from any suitable source of power through a belt 10 trained about a pulley 11 fixed to the shaft 12 of the blower fan 13. The shaft 12 is journaled in bearings 14 mounted upon an upright pedestal 15, to the bottom of which suitable skids 16 are secured to form a base. The pedestal 15 also supports the housing 17 in which the fan 13 operates by means of outwardly extended arms 18 to which the adjacent side wall 19 of the housing is secured in any suitable manner.

The housing 17 has an axially located inlet opening in its outer side wall 20 with which a flexible conveyor tube 21 connects. The outer end or mouth of the tube 21 is extended into the silage or other material in the conveying vehicle 7 to draw the same through the tube into the housing 17. A tangential outlet opening 22 having a second substantially flexible conveying tube 23 connected therewith conducts the silage which is expelled through the outlet opening 22 upwardly and into the silo, as will be readily apparent.

In this manner the filling of the silo is greatly facilitated and the manual labor usually attendant thereto is entirely eliminated.

Experience has proven that the top and front walls directly adjacent the outlet of a pneumatic conveyor are subject to greatest wear and heretofore it has been necessary to discard a blower due to the weakening of these walls, long before the other elements thereof became worn. The present invention therefore contemplates means whereby these portions of the outlet walls may be readily replaced and to this end the annular wall 24 of the conveyor housing 17 terminates at points spaced from the outlet 22. The space remaining between the ends of the wall 24 is partially closed by upper and forward wall sections 25 and 26, respectively.

The cross sectional shape of the sections 25 and 26 is similar to that of the wall 24 and is substantially channel shape with its side flanges directed outwardly to engage the inner surfaces of the side walls 19 and 20 of the housing. Bolts 27 passed through aligned apertures in the side flanges of the sections 25 and 26 and the adjacent marginal edges of the side walls 19 and 20, readily detachably secure these sections in place and their inner ends are also provided with outwardly extending flanges 28 which abut similar flanges 29 formed at the ends of the wall 24. The flanges 28 and 29 also have aligned apertures therein through which bolts 27 pass to maintain the ends of the wall 24 securely connected with the adjacent ends of the sections 25 and 26.

The upper ends of the sections 25 and 26 and the upper portions of the side walls 19 and 20 are cut away, as at 30 and 31, respectively, to facilitate the engagement of a substantially square collar member 32 about the end of the outlet to which a section of tubing 33 having one end square and the other end round is secured by bolts 34 or the like, the conveying tube 23 being connected with the round end.

From the foregoing description taken in connection with the accompanying drawings, it will be readily apparent to those skilled in the art to which an invention of the character described appertains, that we provide an improved conveying mechanism for conducting silage and the like into silos wherein manual labor is practically eliminated and wherein the blower per se is so constructed as to facilitate the ready replacement of those portions which receive the greatest wear.

What we claim as our invention is:

A casing for a pneumatic blower fan, comprising side walls, a transverse wall having outwardly directed lateral flanges secured to the marginal edge portions of the side walls, said transverse wall extending throughout the major periphery of the side walls with the ends thereof spaced from each other, removable wall sections forming continuations of the transverse wall, outwardly directed lateral flanges on said wall sections, said wall section lateral flanges terminating short of the extremities of the adjacent ends of the wall sections and said wall section ends being spaced to form an outlet for the casing, readily removable means connecting the side walls and the wall section lateral flanges, said side walls having their portions adjacent the outlet opening extended at their medial portions to the plane of the removable wall section ends, and an attaching collar secured over the extended portions of the side walls and the ends of the removable sections, said collar engaging the extremities of the lateral flanges of the removable wall sections.

In testimony whereof we have hereunto affixed our signatures.

ALBERT. J. ZAMORSKI.
LEONARD F. HEINTZ.